(12) United States Patent
Gary

(10) Patent No.: US 6,891,298 B2
(45) Date of Patent: May 10, 2005

(54) INTERIOR PERMANENT MAGNET MACHINE WITH REDUCED MAGNET CHATTERING

(75) Inventor: Horst E. Gary, Wildwood, MO (US)

(73) Assignee: Emerson Electric Co., St. Louis, MO (US)

( * ) Notice: Subject to any disclaimer, the term of this patent is extended or adjusted under 35 U.S.C. 154(b) by 122 days.

(21) Appl. No.: 10/229,675

(22) Filed: Aug. 28, 2002

(65) Prior Publication Data

US 2004/0041486 A1 Mar. 4, 2004

(51) Int. Cl.$^7$ .......................... H02K 21/12; H02K 1/27; H02K 1/22
(52) U.S. Cl. ................. 310/156.53; 310/51; 310/156.56
(58) Field of Search ..................... 310/156.48, 156.53, 310/156.54, 156.55, 156.56, 156.08, 156.19, 156.21

(56) References Cited

U.S. PATENT DOCUMENTS

| | | | |
|---|---|---|---|
| 4,568,846 A | 2/1986 | Kapadia | 310/156 |
| 4,819,460 A | 4/1989 | Obradovic | 68/23.7 |
| 4,916,346 A | 4/1990 | Kliman | 310/156 |
| 4,939,398 A * | 7/1990 | Lloyd | 310/156.53 |
| 5,369,325 A | 11/1994 | Nagate et al. | 310/156 |
| 5,481,166 A | 1/1996 | Moreira | 318/254 |
| 5,679,995 A * | 10/1997 | Nagate et al. | 310/156.54 |
| 5,811,904 A | 9/1998 | Tajima et al. | 310/156.45 |
| 5,821,660 A | 10/1998 | Anderson | 310/184 |
| 6,008,559 A | 12/1999 | Asano et al. | 310/156 |
| 6,034,460 A | 3/2000 | Tajima et al. | 310/179 |
| 6,087,751 A | 7/2000 | Sakai | 310/156 |
| 6,208,054 B1 | 3/2001 | Tajima et al. | 310/156 |
| 6,211,593 B1 | 4/2001 | Nashiki | 310/156 |
| 6,218,753 B1 | 4/2001 | Asano et al. | 310/156 |
| 6,318,133 B1 | 11/2001 | Koshiga et al. | 68/23.7 |
| 6,353,275 B1 * | 3/2002 | Nishiyama et al. | 310/156.53 |
| 6,487,769 B2 | 12/2002 | Ketterer et al. | 29/596 |
| 6,525,442 B2 | 2/2003 | Koharagi et al. | 310/156.48 |
| 2002/0116961 A1 | 8/2002 | Kim et al. | 68/23.7 |

FOREIGN PATENT DOCUMENTS

| | | | | |
|---|---|---|---|---|
| DE | 19851883 | 5/2000 | | H02K/1/27 |
| JP | 11046464 | 2/1999 | | H02K/1/27 |
| JP | 11252840 | 9/1999 | | H02K/1/27 |

OTHER PUBLICATIONS

U.S. patent application Ser. No. 10/299,719, Horst et al., filed Aug. 28, 2002, pending.
U.S. patent application Ser. No. 10/229,506, Horst et al., filed Aug. 28, 2002, pending.
U.S. patent application Ser. No. 10/229,826, Horst et al., filed Aug. 28, 2002, pending.

* cited by examiner

Primary Examiner—Tran Nguyen
(74) Attorney, Agent, or Firm—Howrey Simon Arnold & White LLP

(57) ABSTRACT

A rotor for an interior permanent magnet machine that tends to reduce magnet chattering that includes a rotor stack defining at least one magnet retention slot and a permanent magnet positioned within the magnet retention slot, where the magnet retention slot is formed such that movement of the permanent magnet towards at least one end of the slot will tend to cause the magnet to become wedged within the slot.

27 Claims, 13 Drawing Sheets

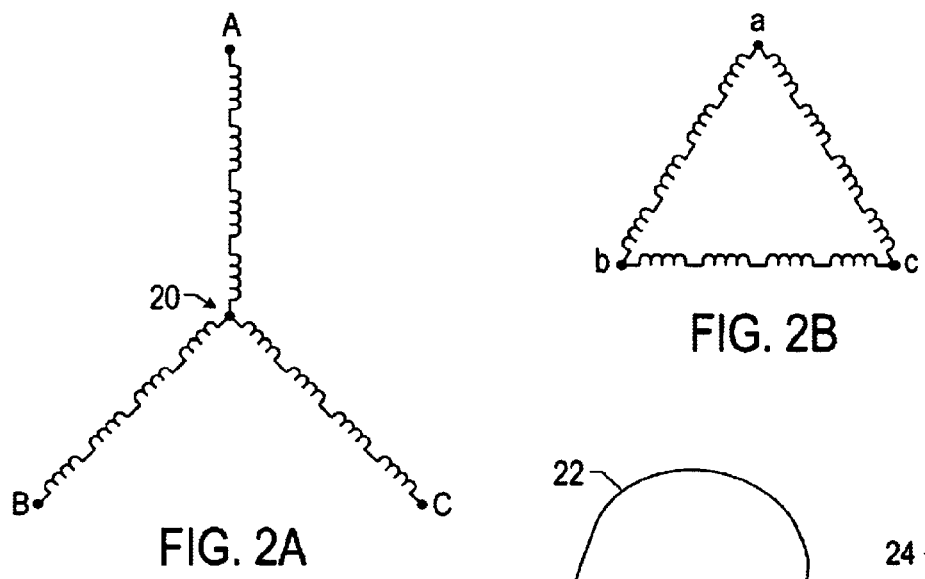
FIG. 2A
FIG. 2B
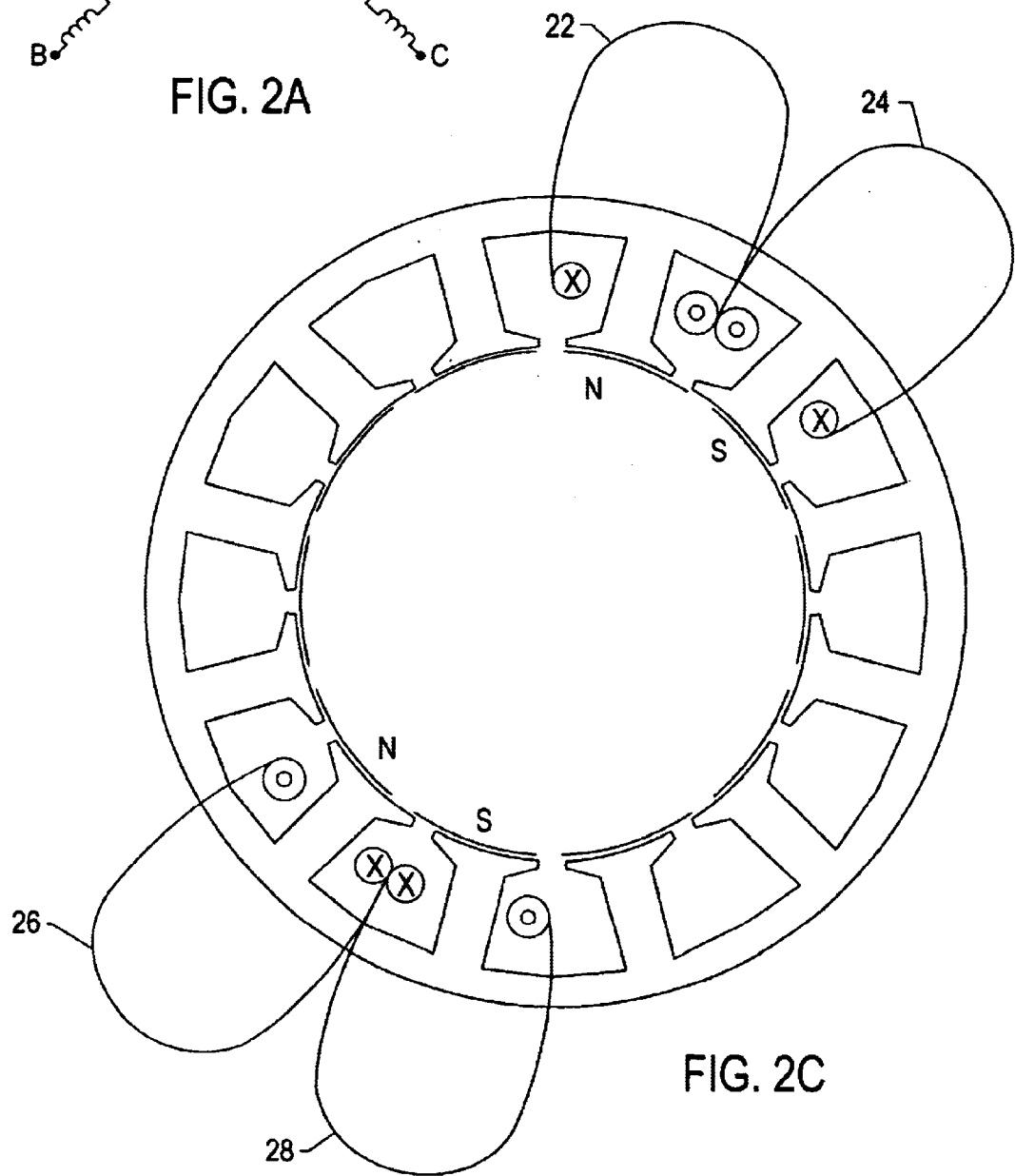
FIG. 2C

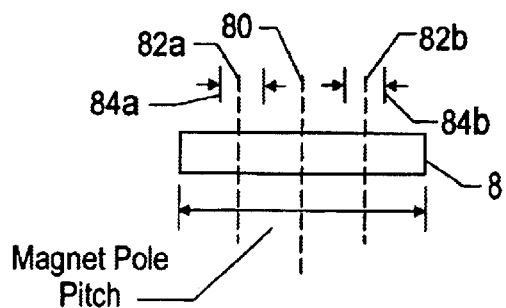
FIG. 8A
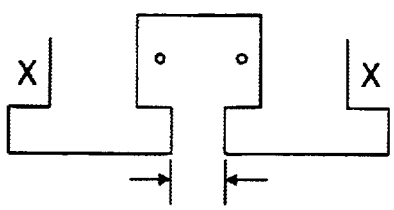
FIG. 8B
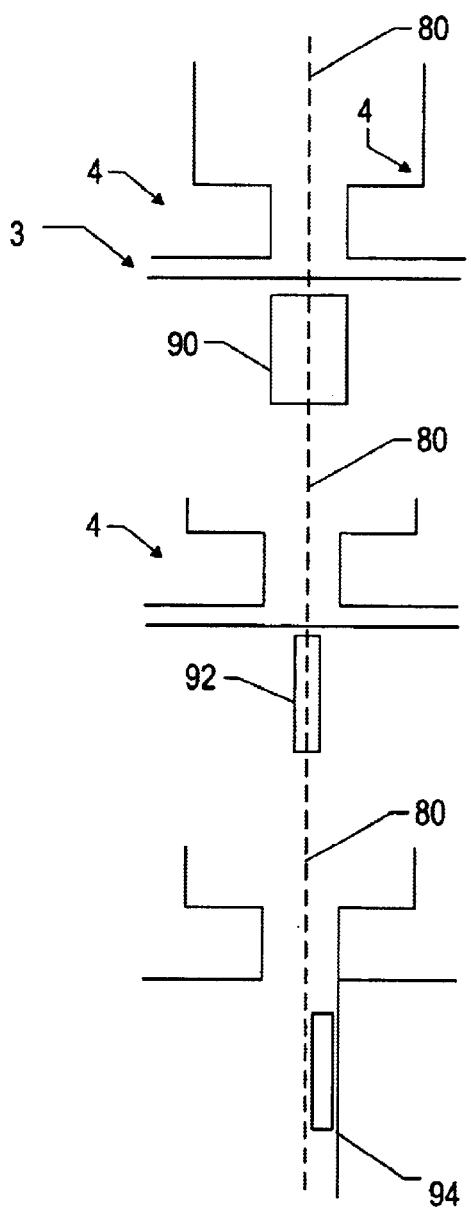
FIG. 9A
FIG. 9B
FIG. 9C

INTERIOR PERMANENT MAGNET MACHINE WITH REDUCED MAGNET CHATTERING

BACKGROUND OF THE INVENTION

The present disclosure relates to interior permanent magnet (or "IPM") machines such as, for example, an IPM motor. IPM machines have been used in various applications in the past, but the use of such machines in applications requiring a high degree of torque from a relatively small machine or low-noise has been limited by certain characteristics of IPM machines.

For example, because IPM machines utilize a rotor that contains a number of interior permanent magnets, there is a tendency for magnetic flux produced by the magnets to circulate between two adjacent magnets. This intra-magnet flux circulation tends to reduce the overall torque output of the machine because the magnetic flux that circulates between the magnets is not readily available for torque production. In addition to reducing the overall torque output of the machine, this intra-magnet flux circulation also tends to decrease the overall efficiency of the machine.

Further, IPM motors because of their use of discretely positioned interior permanent magnets tend to have a degree of unwanted torque ripple or torque variation often known as "cogging torque." Such cogging torque can produce unwanted noise and/or vibrations and can reduce the overall efficiency of the machine.

A further characteristic of IPM machines that potentially limits the torque output and efficiency of such machines is the ability to get current into the windings of such machines. The ability to get current into the machine is an important factor in producing torque and having an efficient machine as the torque out of the machine will correspond closely to the amount of current that is put into the phase windings and the speed at which the current its placed in the phase windings will impact the efficiency of the machines. Typically, IPM motors have had a construction that generally results in the phase windings of such machines having a relatively high inductance. This relatively high inductance has tended to limit the ability to get current in to the windings of such machines.

The present disclosure described several embodiments of IPM machines that are designed to address the described, and other, limiting characteristics of IPM machines to provide an improved IPM machine that has, for example, a relatively high torque output, high efficiency and low cogging torque.

SUMMARY OF THE INVENTION

In accordance with one exemplary embodiment constructed in accordance with certain teachings of the present disclosure, a reduced chattering rotor for an interior permanent magnet machine is provided that includes a rotor stack defining at least one magnet retention slot and a permanent magnet positioned within the magnet retention slot, where the magnet retention slot is formed such that movement of the permanent magnet towards an end of the slot will tend to cause the magnet to become wedged within the slot.

In accordance with another exemplary embodiment constructed in accordance with certain teachings of the present disclosure, a rotor for an interior permanent magnet machine is provided that includes a rotor stack defining at least one magnet retention slot and a permanent magnet positioned within the magnet retention slot where the magnet retention slot defines generally parallel first and second surfaces where the length of the first surface is longer than the length of the permanent magnet, and the length of the second surface is longer than the length of the first surface and where at least one end of the second surfaces defines a sloped region such that movement of the permanent magnet towards that end will tend to cause the permanent magnet to become wedged between the sloped region and the end.

In accordance with yet another exemplary embodiment constructed in accordance with certain teachings of the present disclosure a rotor for an interior permanent magnet machine is provided that includes a rotor stack defining at least one magnet retention slot; and a permanent magnet positioned within the magnet retention slot, wherein the magnet retention slot is formed such that movement of the permanent magnet in a direction generally parallel to the axis of rotation of the rotor towards at least one end of the slot will tend to cause the magnet to become wedged within the slot.

In accordance with still another exemplary embodiment constructed in accordance with certain teachings of the present disclosure a rotor for an interior permanent magnet machine is provided that includes a permanent magnet and means within which the permanent magnet is positioned for inhibiting movement of the permanent magnet during rotation of the rotor.

Other aspects of the present disclosure will be apparent from a review of the disclosure, the figures and the claims.

BRIEF DESCRIPTION OF THE DRAWINGS

The description is presented with reference to the accompanying drawings in which:

FIGS. 2A–2D illustrate in greater detail one exemplary approach for positioning concentrated windings within a stator assembly to form a three phase arrangement found to have particular benefit in applications requiring a relatively high amount of torque from a relatively small machine.

FIGS. 8A–8B generally illustrates some desired regions for the positioning of impedance reduction slits in accordance with the teachings of this disclosure.

FIGS. 9A–9C illustrates exemplary alternate positioning of impedance reduction slits in an IPM machine.

DESCRIPTION OF EMBODIMENTS

Figure 1:
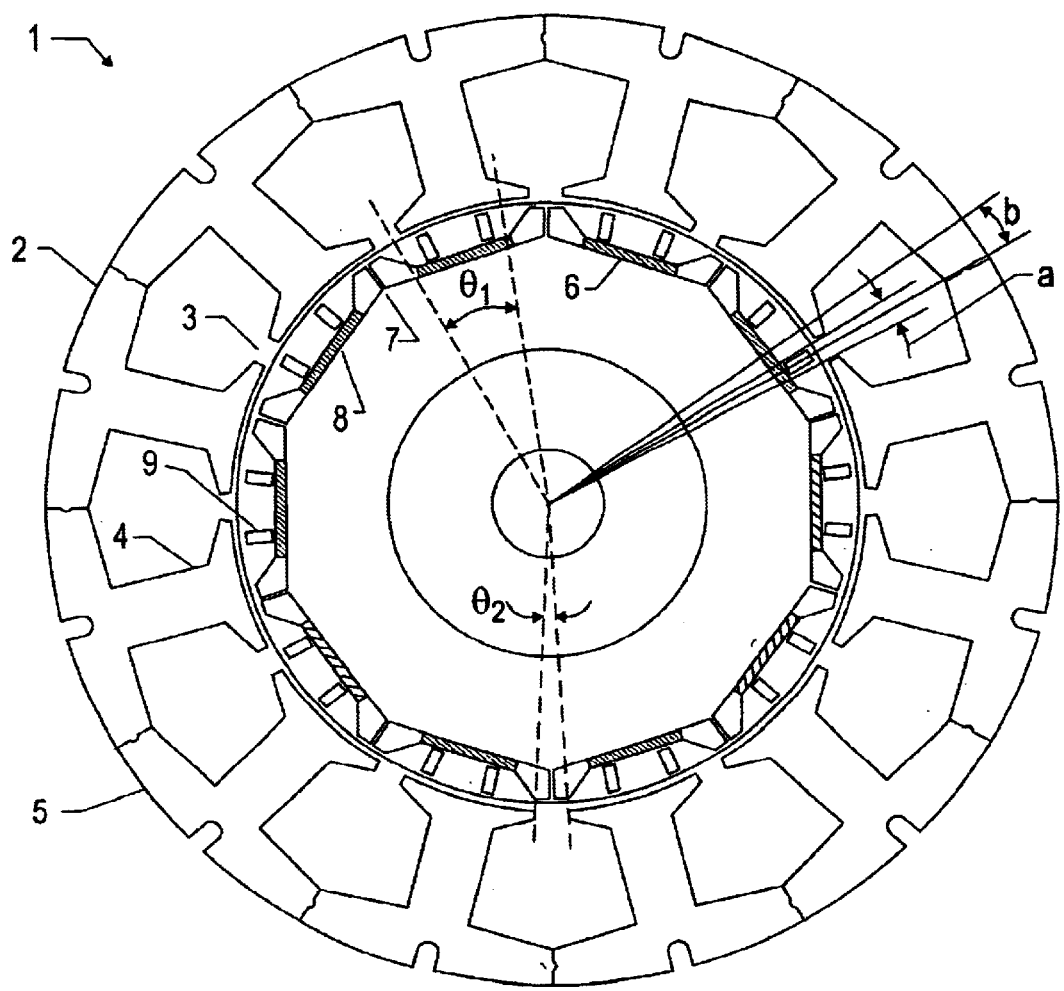
FIG. 1 generally illustrates an improved IPM machine in accordance with certain teachings of the present disclosure.

Turning to the drawings, and in particular to FIG. 1, an improved IPM machine 1 in accordance with certain teachings of the present disclosure is illustrated.

IPM machine 1 includes a stator assembly 2 that defines an interior bore. A rotor assembly 3 is positioned within the interior bore of the stator assembly 2. The rotor assembly 3 may be positioned within the stator assembly 2 through the use of a rotor shaft, rotor bearings and endshields (not illustrated in FIG. 1) in accordance with the known techniques for constructing rotating machines.

The stator assembly 2 defines a plurality of stator teeth 4—twelve in FIG. 1—that extend towards the interior of the stator bore. Each stator tooth 4 includes a neck-like portion extending from the main yoke of the stator assembly 2 and a generally "T-shaped" terminal portion. The ends of the T-shaped portions are separated from one another by a slot opening which, in FIG. 1, has an angular width equal to the indicated angle THETA2. Wound about the neck portions of each stator tooth 4 are winding coils (not illustrated in FIG. 1). In the exemplary embodiment of FIG. 1, each neck portion is encircled by a single winding coil such that the winding coils are "concentrated" about the stator teeth. Such concentrated coils are beneficial because, among other things, concentrated coils allow for the use of short end turns, thus potentially reducing the space and wire required for each winding.

FIGS. 2A–2C illustrate in greater detail one exemplary approach for positioning concentrated windings within the stator assembly 2 to form phase windings that has been found to have particular benefit in applications requiring a relatively high amount of torque from a relatively small machine. Such applications include applications where the IPM machine 1 will be used in an appliance, such as a washing machine and, more particularly, in applications where the IPM machine 1 will be used in a direct drive washing machine such that the washing tub and rotating agitator or impeller (which may be a separate agitator element, an impeller element, a mechanism for moving the drum or other suitable means for moving the clothes in the machine) are directly driven by IPM machine 1 without the use of a geared transmission.

Referring to FIG. 2A, three phase windings labeled A, B and C are illustrated. Each phase winding includes four winding coils, with two coils per leg. One end of each phase winding is electrically coupled to a common point such that the phase windings A, B and C are coupled together at a "Wye" connection point 20. The use of Wye-connected windings allows for the simultaneous energization of two of the phase windings A, B and C.

An alternate winding configuration is illustrated in FIG. 2B in which three phase windings A, B and C are coupled together in a Delta configuration.

FIG. 2C generally illustrates the placement of stator coils for an exemplary phase winding, for example, winding A of FIG. 2A. As illustrated, the phase A winding is formed from four concentrated winding coils 22, 24, 26 and 28. Each winding coil is positioned about a single stator tooth 4 and wound such that, when the current is flowing in a first direction through the phase winding, electromagnet poles having the polarity identified in FIG. 2C are established within the stator. When electric current flows in the opposite direction through the phase winding A, electromagnetic poles of the opposing polarity will be established at the same position within the stator.

As may be noted in FIG. 2C, the coils that are coupled together to form the phase winding A are arranged such that coils 22 and 24 are wound about adjacent stator teeth 4 and coils 26 and 28 are wound about adjacent stator teeth and such that coils 22 is diametrically opposed across the stator from coil 28 and coil 24 is diametrically opposed across from coil 26. The coils are wound such that, when the phase is energized, adjacent coils from the same phase, and diametrically opposing coils from the same phase, establish electromagnets of opposing polarity. Moreover, the winding coils are positioned about the stator teeth 4 such that when the phase winding is energized, all of the coil side turn portions within a given slot (i.e., the axially extending portions of the coils that extend along the length of the stator and that are positioned between the same set of adjacent stator teeth 4) carry current in the same direction The precise form of the winding coils and the number of turns of each coil will vary from application to application and may be adjusted to set the torque output of the IPM machine 1.

Figure 2D:
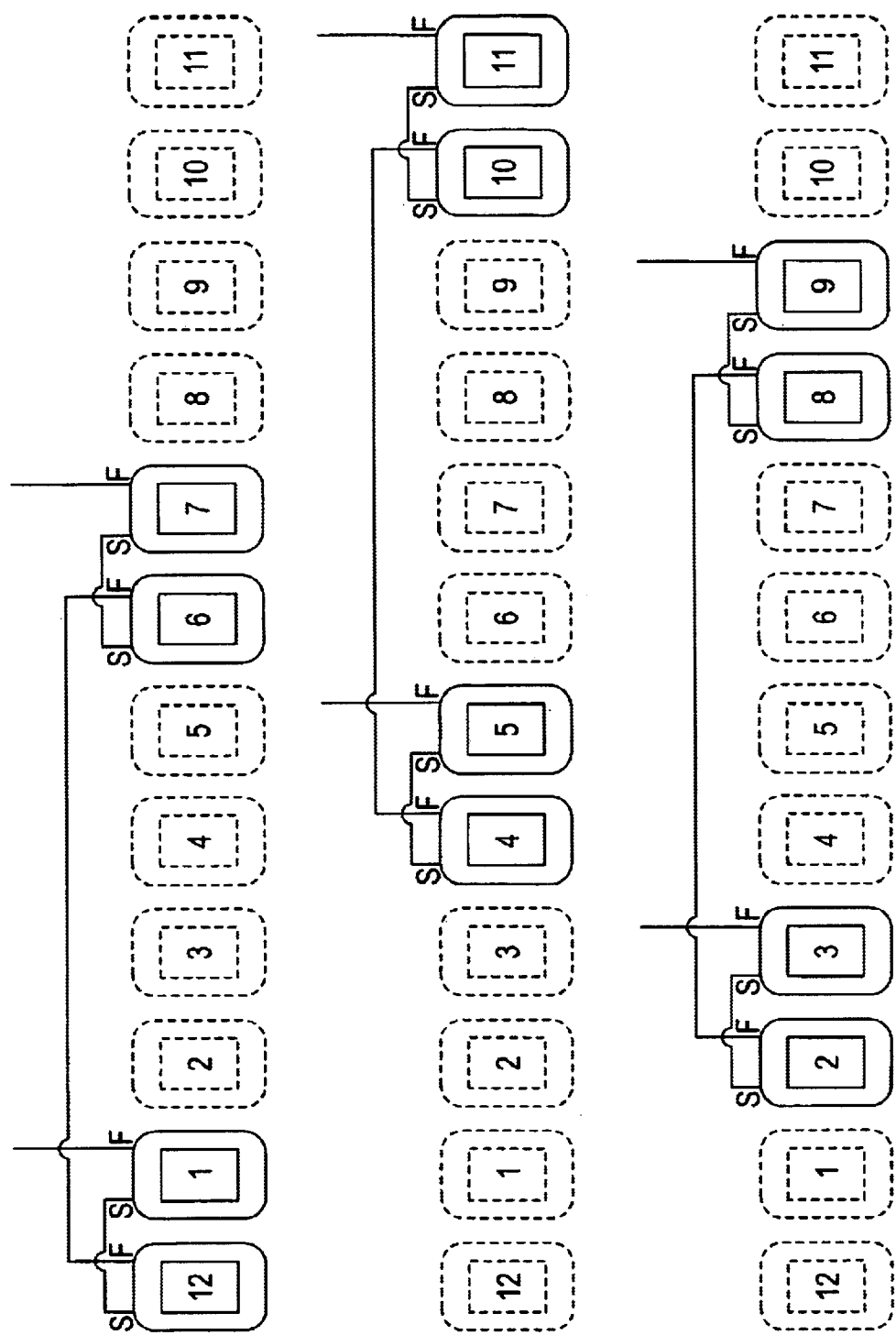

FIG. 2D schematically illustrates the manner in which winding coils may be placed about the stator assembly 2 such that three wye-connected phase windings are established. The numbers 1–12 within the squares of FIG. 2D each correspond to a specific stator tooth 4. As reflected in FIG. 2D, phase winding A includes coils wound about teeth numbers 12, 1, 6 and 7, phase winding B includes coils wound about teeth 4, 5, 10 and 11 and phase winding C includes coils wound about teeth 2, 3, 8 and 9. Although not reflected in the figures, the coils are arranged such that—if two-phase windings are simultaneously energized—e.g., phases A and B—the electromagnets established with the stator on adjacent stator teeth will be of opposing polarity. For example, if the phase A winding is energized such that a North electromagnet pole is established at the terminal point of the tooth number 12 and a South pole is established at the terminal point of tooth number 1, the coils of phase B will be arranged such that a North magnetic pole is established about the terminal point of tooth number 2 and a South magnetic pole will be established about the terminal point of tooth number 3.

Referring back to FIG. 1, the stator assembly 2 may be formed from a stack or substantially identical steel laminations. In one embodiment, the embodiment of FIG. 1, the stator assembly may be formed in a segmented fashion and from individual stator segments 5, where each stator segment 5 comprises a stack of laminations defining one stator tooth 4 and the winding coil would about the tooth 4. The individual segments are then coupled together by known techniques to form the stator assembly 2. In an alternate embodiment the stator assembly 2 is formed from a stack of laminations wherein each lamination defines each of the stator teeth 12. An example of such a non-segmented stator is found in FIG. 2C.

The rotor assembly 3 of FIG. 1 may be formed from a stack of steel rotor laminations that are coupled together through known techniques (e.g., through interlocking features, glue, connectors, etc.). Each rotor lamination defines a plurality of interior magnet retention slots 6. In the exemplary IPM machine 1 of FIG. 1, each rotor lamination defines ten magnet retention slots 6.

Each magnet retention slot 6 defines a central portion that has generally parallel upper and lower walls and, over a defined angular width (identified as THETA1 in FIG. 1), has a cross-section defining a relatively constant dimension along the axis extending from the exterior of the rotor assembly 2 towards the interior of the rotor assembly. Each magnet retention slot 6 further defines end portions, one of which is identified by reference numeral 7, that have a cross-section that has a width that varies along the axis which extends from the exterior of the rotor assembly towards its interior.

A high-energy neodymium permanent magnet 8 in the form of a block magnet having a generally rectangular cross section is positioned within each magnet retention slot 6. The permanent magnets are arranged such that the polarity orientation of each block permanent magnet is opposite the polarity of each adjacent block permanent magnet such that the permanent magnets establish magnetic poles at the exterior of the rotor assembly 3 of alternating polarities. The block permanent magnets 8 may be fixed within the magnet retention slots 6 through the use, for example, of glue. Alternately, the block permanent magnets 8 may be sized to be retained within the magnet retention slots 6 through a friction-fit arrangement.

In one embodiment of an IPM machine 1 constructed in accordance with certain teachings of this disclosure, a special configuration of the magnet retention slots 6 is utilized to help maintain the positioning of the magnets 8 within the magnet retention slots 6 and inhibit unwanted movement of the magnets within the slots at high speeds and/or high current (often times called magnet "chattering") despite minor variations in the size of the block magnets 8 and the precise dimensions of the magnet retention slots 6. This embodiment provides for quieter operation of an IPM and potentially allows for an increase in the tolerances of the dimensions of the block magnets 8 and the magnet retention slots 6 potentially reducing the costs associated with constructing IPM machine 1. One example of this embodiment is depicted in FIG. 3.

Figure 3:
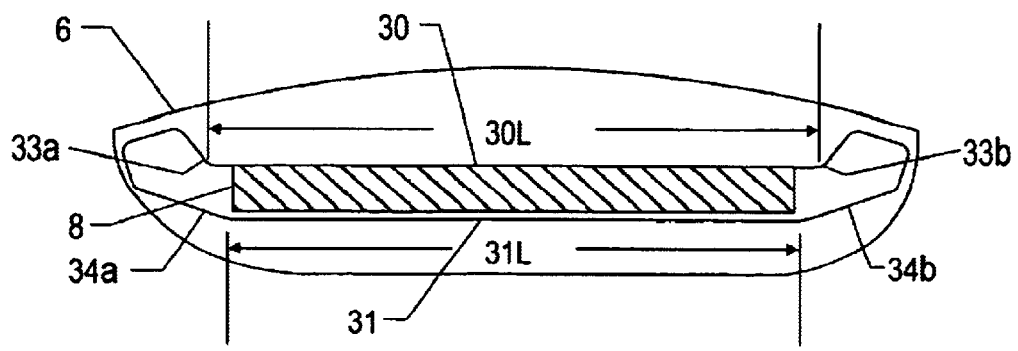
FIG. 3 generally illustrates a magnet retention slot constructed in accordance with certain teachings of the present disclosure.

Referring to FIG. 3, an exemplary magnet retention slot 3 is illustrated. A high-energy block magnet 8 having a generally rectangular cross-section is positioned within the slot 6. The magnet retention slot 6 includes a central portion defined by a top straight surface 30 and a bottom straight surface 31. Each surface defines a plane that runs generally parallel to a plane defined by an upper or lower surface of the block magnet 8.

As reflected in FIG. 3, the length of the lower straight surface (identified as 31L in FIG. 3) is less than the length of the upper straight surface 30 (identified as 30L). Moreover, the length of the lower straight surface 30 is selected to be just slightly larger than the desired length of the block magnet 8. As an example, the upper straight surface may have a dimension of approximately 0.903 inches, while the lower straight section may have a dimension of approximately 0.845 inches.

At points at the end of the upper straight surface 30, the upper surface of the magnet retention slot 6 changes dimension such that relatively sharp edges 33a and 33b are established. The precise nature of the dimension change that occurs at the end point of the upper straight section 30 is not critical to this aspect of this present disclosure as long as a sharp edge is created at the end point.

At the ends of lower straight surface 31, the dimensions of the lower surface of slot 6 change such that upward slopes 34a and 34b are established. These slopes are relatively gentle slopes (for example, equal to or near eighteen degrees (18°). Because the length of the lower straight section 31 is less than the length of the upper straight section 30, the slopes 34a and 34b will underlay the sharp edges 33a and 33b.

The combination of the slopes 34a and 34b and the sharp edges 33a and 33b provide a mechanism wherein permanent magnets 8 positioned with slot 6 may be "locked" in place so as to inhibit side-to-side or axial movement of the magnet 8 within the slot. This is because if a magnet—because of slight variations in the dimensions of the magnet 8 or the slot 6 or because of the speed of rotation or intensity of the magnetic field created within the machine—moves, it will tend to move to a position where the slopes sections 34a and 34b in combination with the sharp edges 33a and 33b "lock" the magnet in place. This is because a shift of permanent magnet 8 towards one end of the magnet retention slot 8 (e.g., a shift to the left) will cause the end of the magnet 8 in the direction of movement to slide up the slope (e.g., the left slope 34a) thus causing the magnet 8 to become wedged between the upper surface or the slot 6 and the lower sloped surface or causing the sharp edge opposite the slope (e.g., edge 33a) to cut into, bite or grip the end of the magnet 8 and thus retain the magnet in the shifted position. Depending on the speed of rotation and the intensity of the electromagnetic fields within the machine acting on the magnets 8, the magnet 8 may become locked or wedged in the shifted position such that it will not move during future operation of the machine and magnet chattering or movement is thereby eliminated or reduced. Because the magnets are interior to the rotor assembly 3, the locking of the permanent magnets 8 in a slightly shifted position does not substantially affect the net magnetic flux created by the permanent magnets or substantially affect the output characteristics of the machine.

Figure 4A:
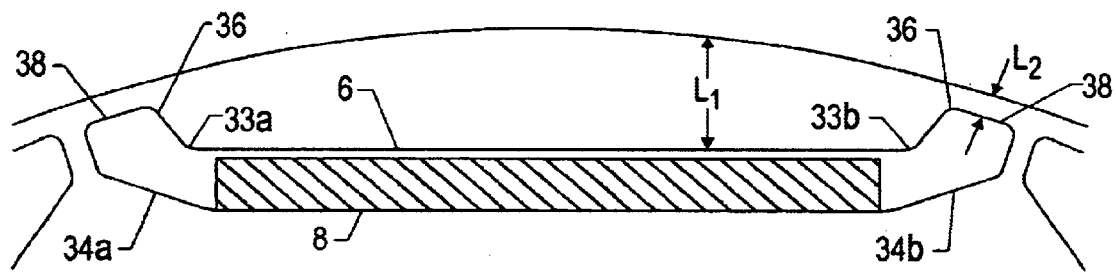
FIGS. 4A–4C generally illustrates the shifting and locking of a magnet within the magnet retention slot of FIG. 3.
Figure 4B:
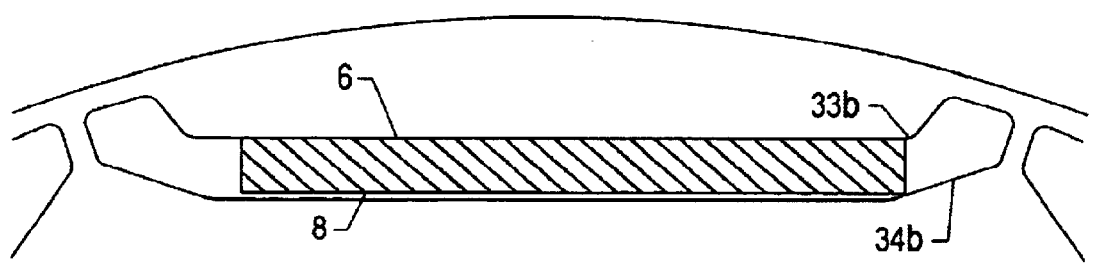
Figure 4C:
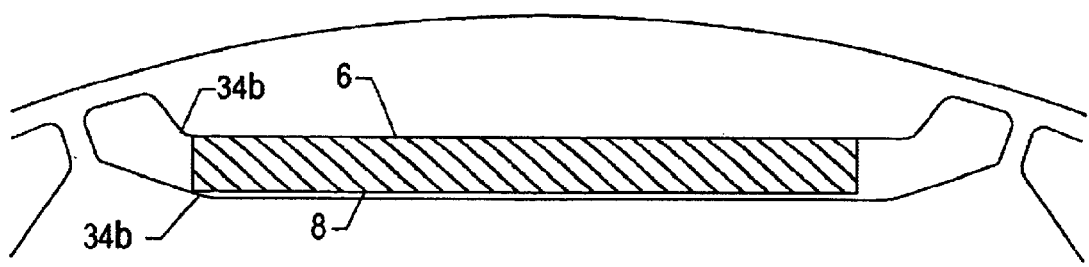

The shifting and locking of a magnet 8 within the slot 6 of FIG. 3 is generally illustrated in FIGS. 4A–4C.

FIG. 4A generally illustrates a block magnet 8 positioned within a slot 6 having a configuration as described with respect to FIG. 3. FIG. 4B generally illustrates the situation that would exist if the magnet 8 were to be shifted to the right. As illustrated, the magnet 8 will shift up the slope to a point where the magnet is wedged between the upper surface near point 33b and the lower sloped surface 34b. FIG. 4C generally illustrates the wedging that would occur if there were a left-shift of magnet 8.

In the example of FIGS. 3 and 4A–4C, the slot 6 was configured to have edges and sloped portions at both ends of the slots. Alternate embodiments are envisioned wherein the slots are configured such that the portions of the slot that provide wedging opportunities for the magnet are located on only one end of the slot.

In exploiting the embodiment depicted in FIGS. 3 and 4A–4C, the magnets 8 may be allowed to become wedged within the slots 6 during normal operation of the motor. Alternately, the magnets may be "pre-wedged" upon assembly or testing of the IPM machine by running and/or running and braking a motor having a construction as depicted in the figures at relatively high speeds. In such a process, the speed and intensity of the magnetic field used in the pre-wedging process would be such as to likely ensure wedging of all or most of the permanent magnets that are within the interior of the rotor assembly.

The use of magnet retention slots as described above in connection with FIGS. 3 and 4A–4C tends to preclude side-to-side movement of the permanent magnets positioned within the slots. The same approach can be used to preclude axial movement of the permanent magnets by establishing, in the axial direction by establishing magnet retention slots that on their axial ends define sloped edges generally as described above such that the permanent magnets can become wedged between such edges should the magnets move axially. The axial wedges can be established by inserting axially extending inserts into one or both of the open ends of the magnet retention slots or by gradually changing the geometries of the magnet retention slots for the outer rotor laminations such that the laminations themselves define one or more axial wedges. The techniques described above to inhibit side-to-side movement and axial movement can be used alone, in combination with one another or in combination with other approaches for retaining the magnets within the slots such as, for example, the use of adhesives.

Referring to the magnet retention slots 6 of FIGS. 3 and 4A–4C, it may be noted that there is a change in the dimension of the slot 6 at a point spaced apart from the magnet 8 where a transition in the slot dimension produces a relatively significant change in the radial thickness of the rotor portion that is above the slot 6 and the portion above the slot 6 narrows to define a bridge portion having a relatively constant radial thickness. This transition point is identified as point 36 in FIG. 4A and the bridge portion is identified as region 38. As may be appreciated from an inspection of FIG. 4A near point 36, the radial thickness of the portion of the rotor above the slot transitions from a first thickness, identified as L1 in FIG. 4A, to a second thickness, identified as L2, where L2 is substantially smaller than L1. It has been unexpectedly determined that the general region where this transition occurs can have a significant effect on the output torque of the motor, and that by carefully controlling the region in which the transition occurs, undesired cogging torque can be reduced.

Figure 5:
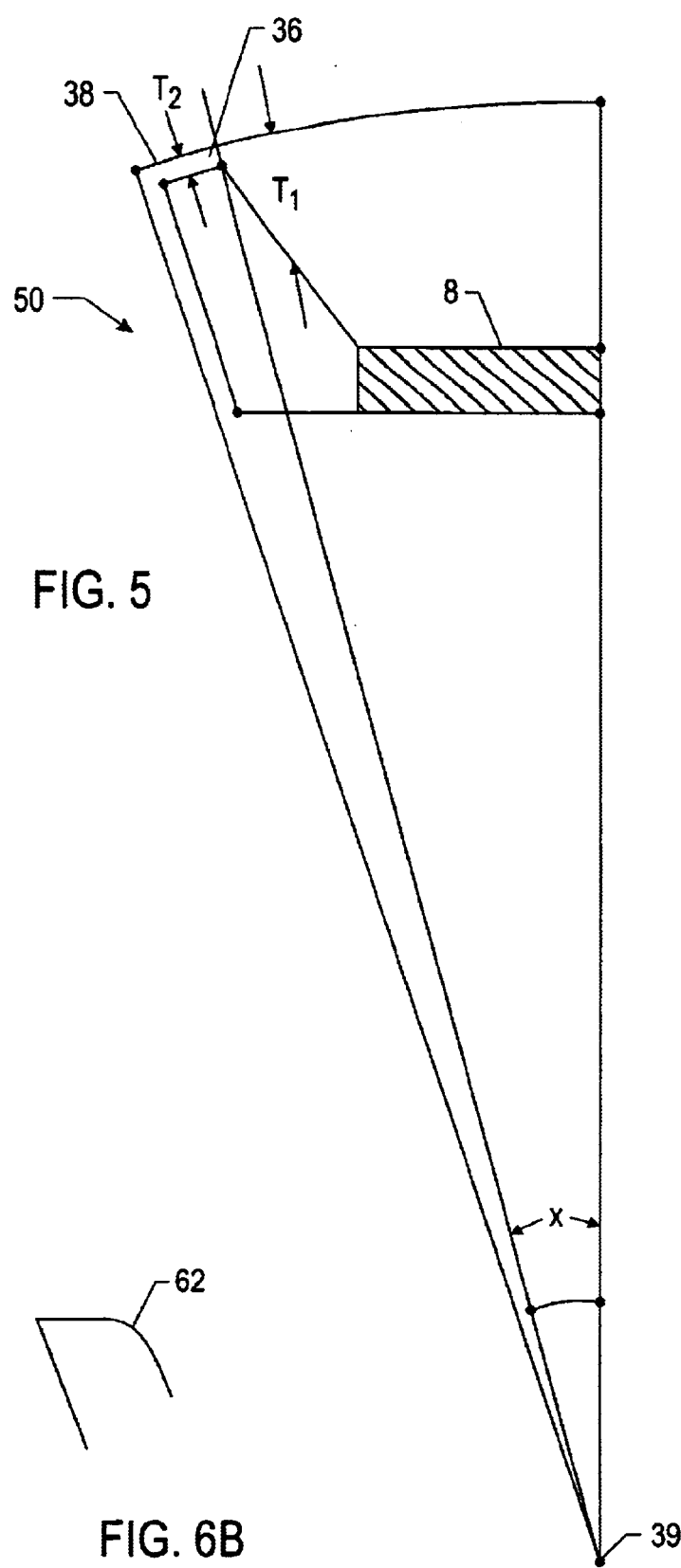
FIG. 5 generally illustrates an expanded view of one end of a magnet retention slot constructed in accordance with certain teachings of the present disclosure.

FIG. 5 generally illustrates an expanded view of one end of a magnet retention slot 50. A block magnet 8 is shown positioned within the slot. The magnet 8 may be retained within the slot through glue or adhesive or through a locking arrangement as described above in connection with FIGS. 3 and 4A–4C. If such a locking arrangement is used, the lower surface of the slot 50 would differ from that depicted in FIG. 5.

As reflected in FIG. 5, there is a point 36 where the region above the slot narrows from a region with a first radial thickness (T1) to a second radial thickness (T2) to form a bridge 38. The point 36 corresponds to an angle X that is defined in electrical degrees as the angular expanse between the mid-point of the magnet 8 and the point at which the slot transitions from a first thickness to a second thickness to define the bridge 38. The angle X is with respect to a point 39 which is the point about which the rotor rotates.

It has been found that the cogging torque of the IPM machine utilizing a slot as depicted in FIG. 5 is reduced if the angle X is somewhere with in the ranges of from between approximately one-hundred and forty eight electrical degrees (148° electrical) and approximately one-hundred and fifty electrical degrees (150° electrical), where the angle in electrical degrees is equal to the angle in mechanical degrees multiplied by number of permanent magnet rotor poles in the machine. Thus, for an IPM having ten permanent magnet rotor poles, the ideal angle X would be within the range of approximately 148° electrical to approximately 150° electrical, or from approximately 14.8° mechanical to approximately 15° mechanical. For a rotor having six permanent magnet poles, the ideal range X would be from approximately 24.7° mechanical (148/6) to approximately 25° mechanical (150/6). The precise dimensions of the thickness of the radial portion of the rotor above the slot are not believed to be critical, but a bridge dimension of approximately 0.060 inches has been found acceptable.

For magnet retention slots having the general configuration of the slot illustrated in FIG. 5, it has been found beneficial for reducing cogging torque to ensure that the transition from the radial thickness of the first dimension to the radial thickness of the second dimension that defines the bridge is not an abrupt transition but rather a gradual transition. Such a gradual transition may be accomplished by having a corner with a radius. This is generally illustrated in FIGS. 6A and 6B.

Figure 6A:
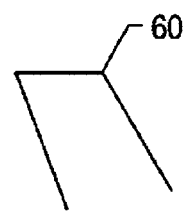
FIGS. 6A and 6B generally illustrate a gradual transition from a radial thickness of a first dimension of a magnet retention slot to the radial thickness of the second dimension that defines a bridge.
Figure 6B:
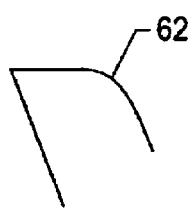

FIG. 6A illustrates a portion of a magnet retention slot having a point 60 where the thickness of the rotor above the slot transitions from one dimension to a smaller dimension that defines a bridge. While positioning point 60 within the region described above (i.e., from approximately 148° electrical to approximately 150° electrical) can result in a reduction in the cogging torque of the machine, further reduction in cogging torque can be obtained by eliminating the abrupt transition at point 60. This may be accomplished by having the transition occur about a corner with a radius as illustrated in FIG. 6B by the corner 62 having a radius R. While the dimension of the radius R will vary from application to application, a dimension where R=0.015 inches has been found appropriate in some applications.

Referring back to FIG. 1, it may be noted that in addition to defining the magnet retention slots 6, the laminations defining the rotor assembly 3 also define impedance reduction slits 9. In the example of FIG. 1, there are a total of twenty (20) impedance reduction slits 9 with two impedance reduction slits 9 being associated with each permanent magnet 8.

In the illustrated example of FIG. 1, the impedance reduction slits 9 are slits of air pockets formed in the rotor at specific locations that reduce the impedance of the phase windings at all positions of the rotor and, thus, allow for more current to be put into the phase windings of the stator assembly 2, potentially resulting in a higher torque output for the machine 1.

Figure 7:
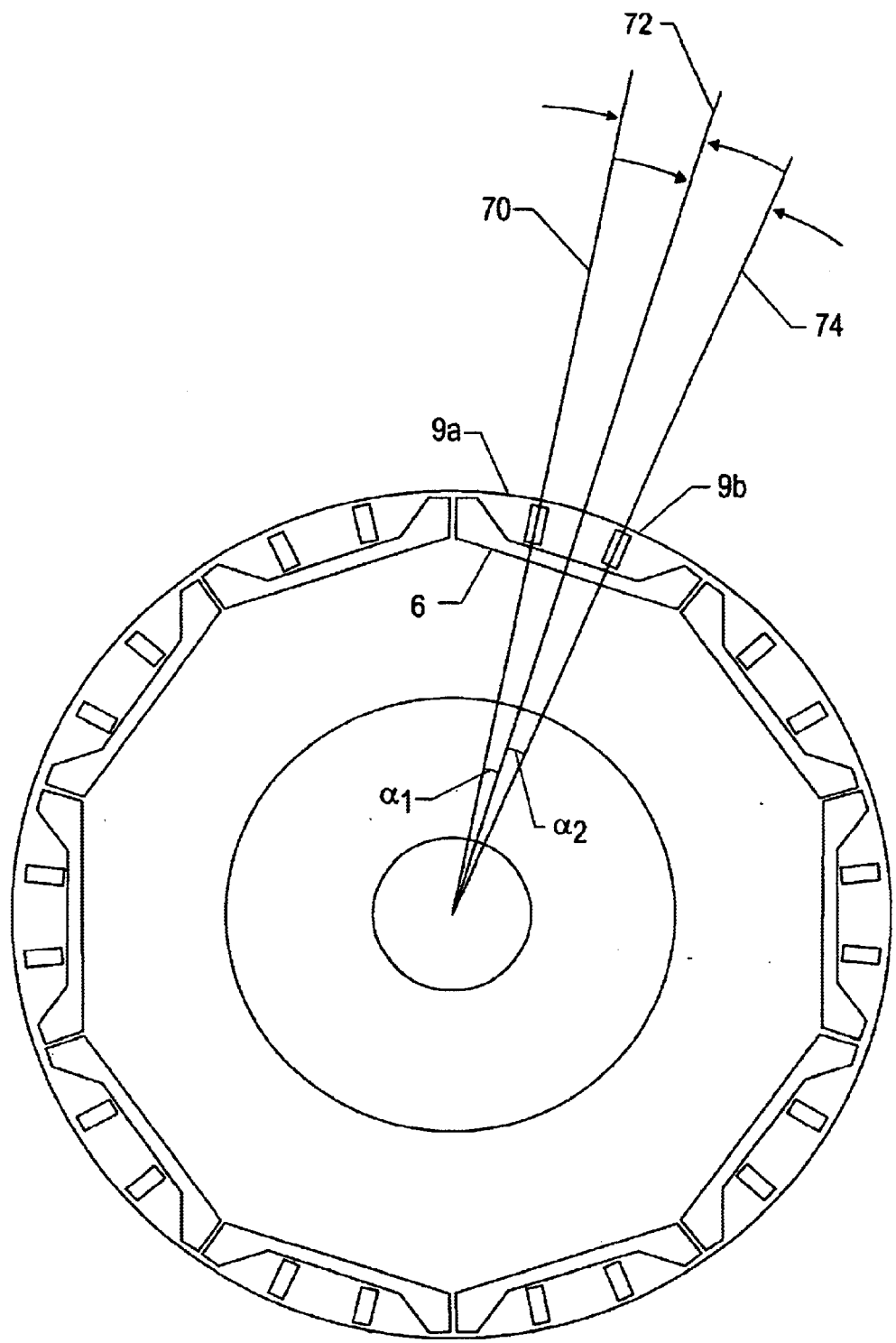
FIG. 7 generally illustrates exemplary locations for impedance reduction slits about a rotor in accordance with certain teachings of the present disclosure.

The location of the impedance reduction slits 9 is more specifically illustrated in FIG. 7 where the rotor assembly 3 of FIG. 1 is illustrated apart from the stator assembly 2. Two impedance reduction slits 9a and 9b are identified.

As reflected in FIG. 7, the exemplary impedance reduction slits 9a and 9b are positioned such that an imaginary line 70 passing radially outward from the center of the rotor (i.e., the point about which the rotor rotates) through the midpoint of the slit 9a defines an angle ALPHA1 with respect to the an imaginary centerline 72 radially extending from the counterpoint of the rotor to through the midpoint of the magnet retention slot 6 with which the slits 9a and 9b are associated. Similarly, an imaginary line 74 passing radially outward from the center of the rotor (i.e., the point about which the. rotor rotates) through the midpoint of the slit 9b defines an angle ALPHA2 with respect to the imaginary centerline 72. In the illustrated example of FIG. 7, ALPHA1 is the same as ALPHA2.

It has been determined that the desired values for ALPHA1 and ALPHA 2 will vary depending on the number of stator teeth (or stator poles for machines using concentrated windings) and the number of permanent magnet rotor poles. Specifically, it has been determined that the optimal value for ALPHA1 and ALPHA2 is defined by the following formula which defines the desired angle for ALPHA1 and ALPHA2 in terms of mechanical degrees:

Desired Angle=Absolute Value [360°/(Number Rotor Poles)–360°/(Number Stator Poles)]

Thus, in the example of FIGS. 1 and 7, where there are twelve (12) stator poles and ten (10) rotor poles, the ALPHA1 and ALPHA2 are equal to six mechanical degrees (6°) because:

Desired Angle=Absolute Value [136°/10–360°/12]

Desired Angle=Absolute Value [36°–30°]

Desired Angle=6°

In the example of FIG. 7, the impedance reduction slits 9a and 9b are selected to have a have an angular width that is approximately equal to the angular width of the slot opening between the ends of adjacent stator teeth. The slot opening was discussed above in connection with FIG. 1 and is identified as the angle defined by THETA2 in FIG. 1.

Alternate embodiments of IPM machines having impedance reduction slits as described herein are envisioned. Specifically, alternate embodiments are envisioned wherein the angular width of the impedance reduction slits is less than the angular width of the slot opening between adjacent stator teeth. Still further in the example of FIG. 7, the impedance reduction slits 9a and 9b have counterpoints that are in alignment with an imaginary line that is offset from an imaginary line passing from the counterpoint of the rotor through the associated permanent magnet by the desired angle. Alternate embodiments are envisioned wherein the centerline of the impedance reduction slits is otherwise positioned.

FIGS. 8A–8B generally illustrate some desired regions for the positioning of impedance reduction slits in accordance with the teachings of this disclosure. In particular, FIG. 8A illustrates an exemplary permanent magnet 8 having a centerpoint such that an imaginary line 80 would pass from the center of the rotor (not shown) through the centerpoint of magnet 8. For purposes of clarity, the rotor assembly within which the permanent magnet 8 is position is not illustrated. Imaginary lines 82a and 82b define lines passing from the centerpoint of the rotor through the magnet that are offset from the line 80 by an angular amount equal to the DESIRED ANGLE for the given machine, as the DESIRED ANGLE is determined using the formula defined above. Regions 84a and 84b are regions that have a centerpoint defined by lines 82a and 82b, respectively, and that have an angular width equal to the angular width of the slot opening for adjacent stator teeth. As an example, FIG. 8B illustrates the approach for measuring the slot opening of exemplary adjacent stator teeth.

In general, it has been determined that desired benefits from the use of impedance reduction slits may be achieved such that all or a portion of the air gaps defined by the slits are within the region 84a and 84b as described above.

FIGS. 9A–9C illustrate exemplary alternate positioning of impedance reduction slits in an IPM machine. For purposes of illustration, only one of the two slits would be associated with a given permanent magnet.

Referring to FIG. 9A, a rotor assembly 3 is illustrated, as are two stator teeth 4. The rotor assembly includes an impedance reduction slit 90 that, as reflected in the figure, has an angular width substantially equal to the angular with of the slot gap between adjacent stator teeth 4. Additionally the slit 90 is positioned such that the centerline of the slit 90 is in alignment with the imaginary line 80 of FIG. 8A. FIG. 9B illustrates a similar view of a machine, although the machine of FIG. 9B includes an impedance reduction slit 92 that has an angular width of approximately one-half of the slot gap width. As with the slit of FIG. 9A, the slit of FIG. 9B is aligned such that its centerline is in alignment with imaginary line 80. FIG. 9C illustrates yet another alternate embodiment where an impedance reduction slit 94 is illustrated. The, impedance reduction slit 94 of FIG. 9C is not aligned with the imaginary line 80, but is instead offset from that line such that the line 80 does not pass through the slit 94. Note, however, that the slit 94 is still within the region having an angular width equal to the width of the slot gap and a centerline co-incident with line 80.

In each of the examples of FIGS. 1, 7, 8A, and 9A–9C, the impedance reduction slits have comprised punched out air gaps that are generally rectangular and that are surrounded on all sides by the rotor lamination in which the slits are formed. Alternate forms of impedance reduction slits are envisioned. In general, the impedance reduction slits can take any form of region in the rotor lamination that has a relatively low permeability. For example the impedance reduction slits need not be air pockets but can be pockets of some other low permeability substance (e.g., a non-conductive epoxy). Still further the impedance reduction slits can take various geometric forms and need not be rectangular.

FIGS. 10A–10F generally illustrate some of the alternate forms the impedance reduction slits may take.

Figure 10A:
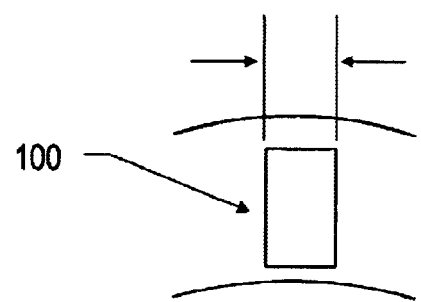
FIGS. 10A–10F generally illustrate some of the alternate forms the impedance reduction slits of FIGS. 8A–8B may take.
Figure 10B:
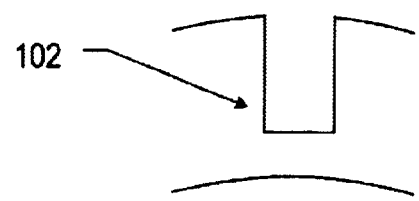

FIG. 10A generally illustrates an impedance reduction slit 100 formed within the interior of the rotor and having a rectangular shape. FIG. 10B illustrates a slit 102 that is open-ended in the sense that the upper end of the slit is open and not enclosed by the rotor lamination.

Figure 10D:
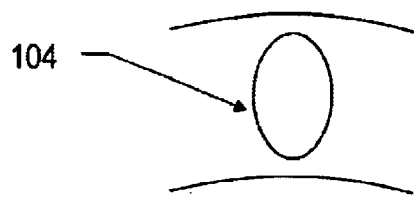
Figure 10E:
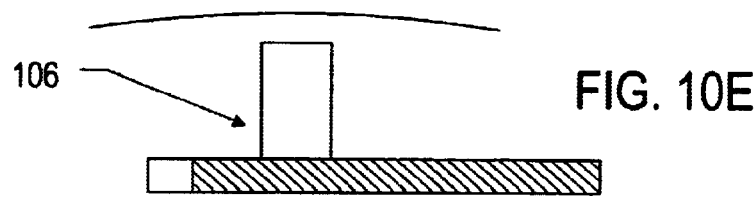
Figure 10F:
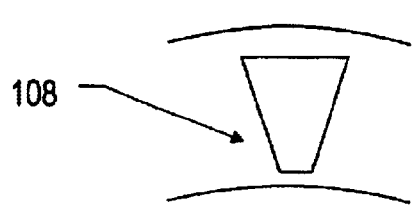
Figure 10C:
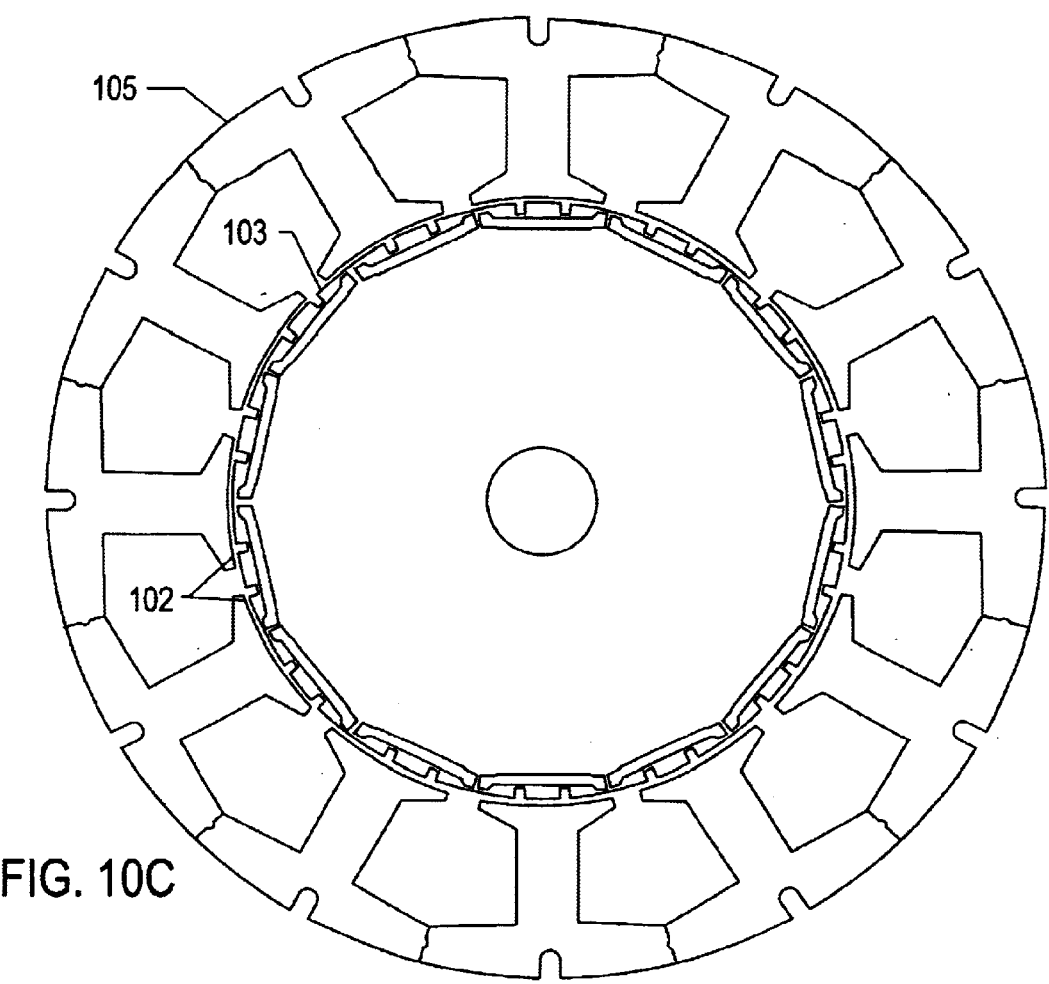

A full illustration of an IPM machine utilizing impedance reduction slits is provided in FIG. 10C where a rotor assembly 103 is illustrated positioned with a stator assembly 105. As may be noted, the rotor assembly defines two open-ended impedance reduction slits 102 for each permanent magnet. FIG. 10C also illustrates the use of impedance reduction slits with machines having stator pole/rotor pole combinations different from that described above in FIGS. 1 and 7. In FIG. 10C, the illustrated IPM machine includes twelve (12) stator poles and fourteen (14) permanent magnet rotor poles. As such, the DESIRED ANGLE defining the region in which the impedance reduction slits will be placed will vary from that of the previous examples. In the example of FIG. 10C, each impedance reduction slit 102 has a centerpoint that coincides with the line extending from the centerpoint of the rotor offset from the line passing through the centerpoint of the corresponding permanent magnet by the DESIRED ANGLE. In the example of FIG. 10C, the DESIRED ANGLE is 4.29° mechanical as:

Desired Angle=Absolute Value [136°/14−360°/12]

Desired Angle=Absolute Value [25. 71°−30°]

Desired Angle=4.29°

FIG. 10D illustrates an alternate embodiment wherein the impedance reduction slit 104 has a generally oval configuration. FIG. 10E illustrates an alternate embodiment where the impedance reduction slit is rectangular and extends from and is attached to a magnet retention slot 107. Finally, FIG. 10F generally illustrates a wedge-shaped impedance reduction slot 108.

Figure 11:
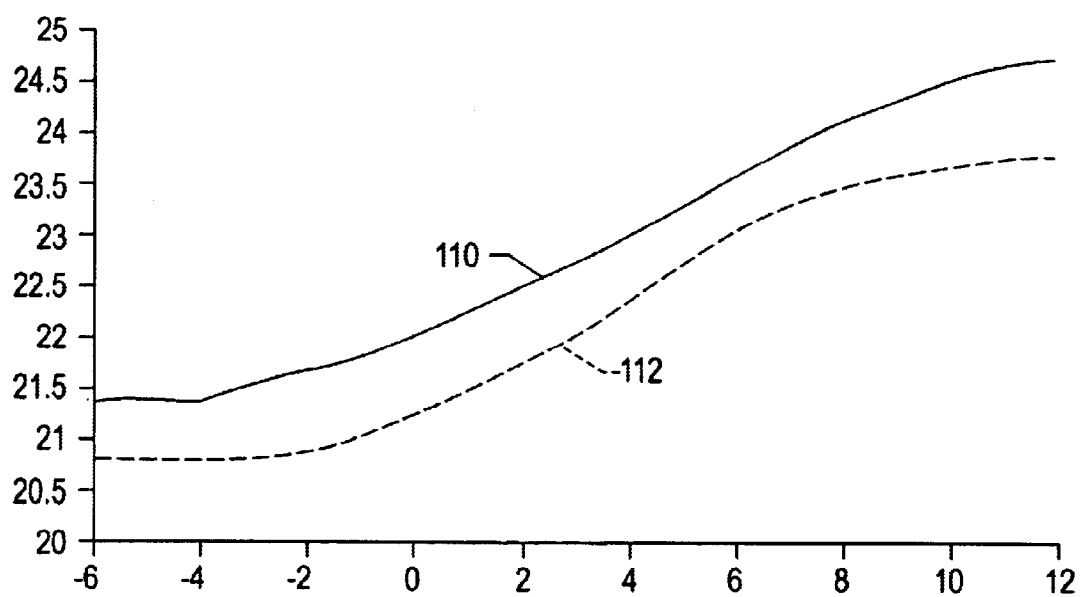
FIG. 11 generally illustrates the flux linkage between adjacent coils of a stator having concentrated coils vs. rotor position for a hypothetical machine having only one slit associated with each permanent magnet and a hypothetical machine having two impedance reduction slits positioned.

The use of two impedance reduction slits positioned as described above produces significantly better results that the use of a single center-positioned slit. This is generally reflected in FIG. 11 which graphically illustrates the flux linkage between adjacent coils of a stator having concentrated coils vs. rotor position for a hypothetical machine having only one slit associated with each permanent magnet (line 110) and a hypothetical machine having two impedance reduction slits positioned as described above (line 112). As will be appreciated the lower the flux-linkage, the lower the impedance of the machine, and the lower the impedance of the machine, the more current that can be put into the windings and the greater the output torque. As FIG. 11 reflects, at all angular positions of the rotor the flux linkage of the machine having two slits position as described herein (112) is less than the flux linkage associated with a machine having only a single slit (110).

In the examples described above, two impedance reduction slits are associated with each permanent magnet. Alternate embodiments are envisioned wherein more slits are associated with each permanent magnet with at least two of the slits being positioned as described herein. For example, alternate embodiments are envisioned wherein there are three impedance reduction slits associated with each permanent magnet with two of the slits positioned as described herein and one of the slits positioned in a region defined by the imaginary line passing from the center of the rotor through the centerpoint of the associated permanent magnet.

As described above, FIGS. 1 and 7–11 illustrate advantages that have been discovered to be associated with the use of low permeability regions (in the described examples air pockets defined by slits) positioned about the rotor assembly above the permanent magnets. It has also been discovered that the careful positioning of low permeability regions between the ends of the permanent magnets can have a beneficial result in the output characteristics of the machine. Specifically, it has been determined that the inclusion of regions of low permeability having a specific geometry between adjacent permanent magnets can result in higher torque output of the machine.

Figure 12A:
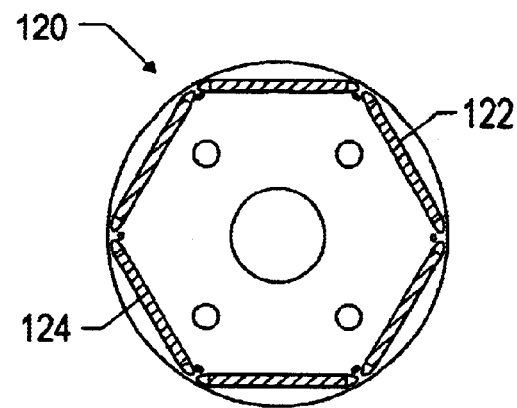
FIGS. 12A and 12B generally illustrate a rotor assembly for use in an IPM machine having low permeability regions between adjacent permanent magnets.
Figure 12B:
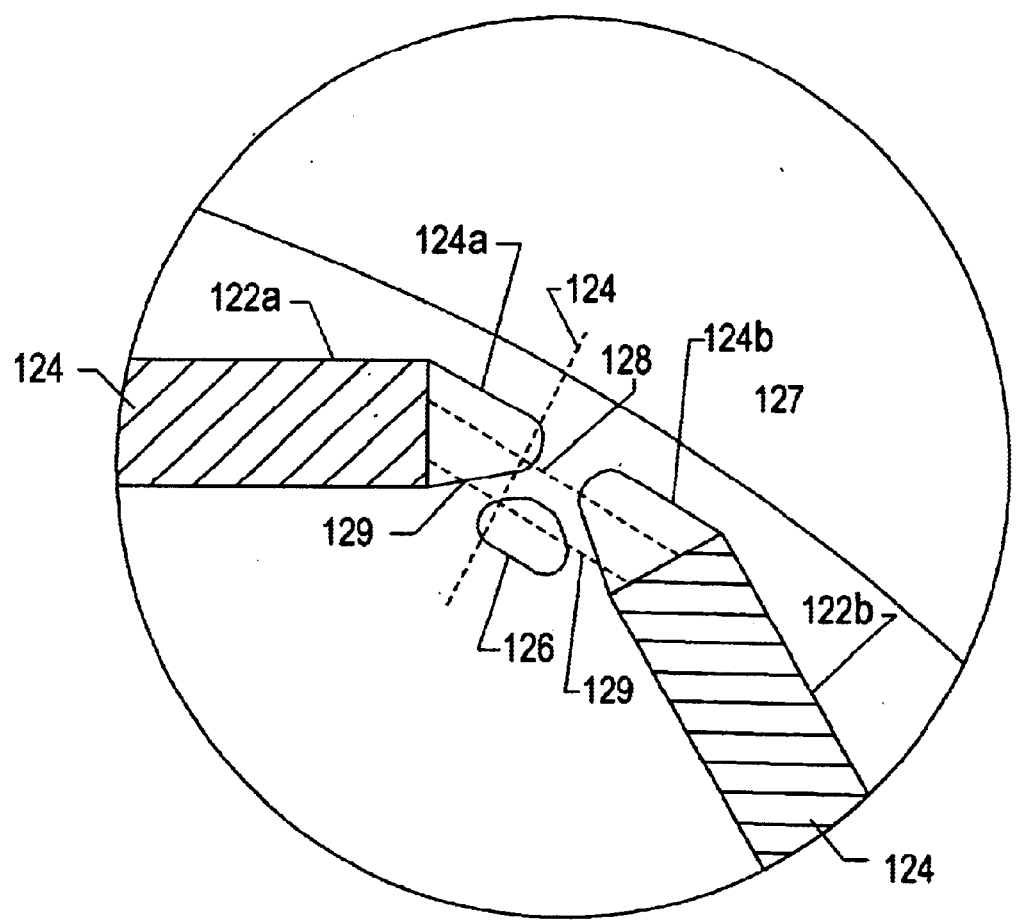

FIGS. 12A and 12B generally illustrate a rotor assembly 120 for use in an IPM machine having low permeability regions between adjacent permanent magnets as described above. Referring to FIGS. 12A and 12B, the rotor assembly 120 is formed from a stack of laminations as generally described above in connection with rotor assembly 3 of FIG. 1. The rotor assembly 120 defines six magnet retention slots 122. Each magnet retention slot 122 defines a central portion in which a permanent magnet 124 is positioned. Each magnet retention slot 122 further defines ends so that an air gap exists between the end portions of the permanent magnet 124 within the slot and the outer edges of the magnet retention slot 122. This feature is generally reflected by FIG. 12B, which illustrates portions of two magnet retention slots 122a and 122b. Each of these magnet retention slots defines a central portion in which a magnet 124 is positioned at an end portion 124a and 124b that has an angled geometry such that an air gap 124a and 124b is formed. It will be appreciated that the geometry of the end portions 124a and 124b is not critical and that other geometries are possible provided that they define an air gap between the edge of the permanent magnet in the slot and the edges of the slot.

Positioned between the magnet retention slots 122a and 122b is a region of low permeability 126 in the form of an air gap. The region of low permeability 126 is shaped, sized and positioned such that in combination with the air gaps 124a and 124b; (i),there are no direct linear paths between the end edges of the two adjacent magnets that do not pass through an area of low permeability, and (ii) there are no direct linear paths that extend radially from the outer portion of the rotor to the interior of the rotor, between the permanent magnets, that do not also pass through an area of low permeability. For example, the imaginary linear path 128 passing between the end edges of the adjacent permanent magnets will pass through the low permeability regions 124a and 124b. Similarly, the path corresponding to line 129 will pass through the low permeability regions defined by air gaps 124a and 124b and also pass through the area of low permeability 126. In the radial direction, the imaginary line 124 will pass through low permeability region 124a and the imaginary line 124 will pass through the low permeability region 126.

As an inspection of FIG. 12b will reveal there are no straight-line paths between the edges of the adjacent permanent magnets or radially between the adjacent permanent magnets that do not pass through an area of low permeability. It has been discovered that by positioning areas of low permeability to meet the criteria described above, the magnetic flux of the machine is concentrated away from the adjacent permanent magnets and into the air gap of the machine, thus producing higher torque and resulting in a lower Q axis inductance of the machine (which potentially allows more current to be put into the machine).

Figure 13:
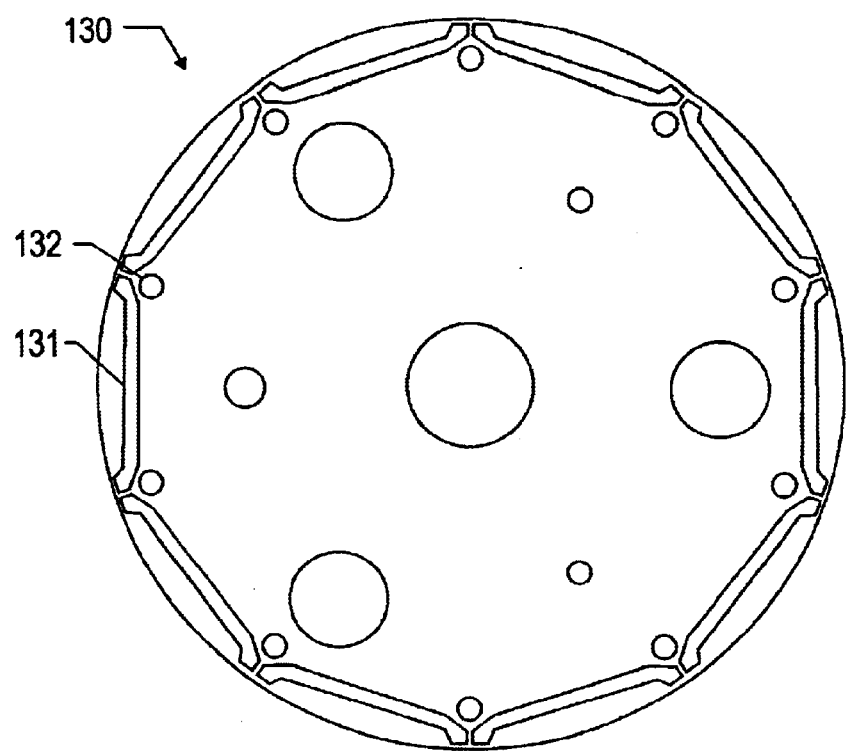
FIG. 13 generally illustrates a rotor assembly that uses magnet retention slots having upturned ends and an inter-slot area of a circular shape.
Figure 14:
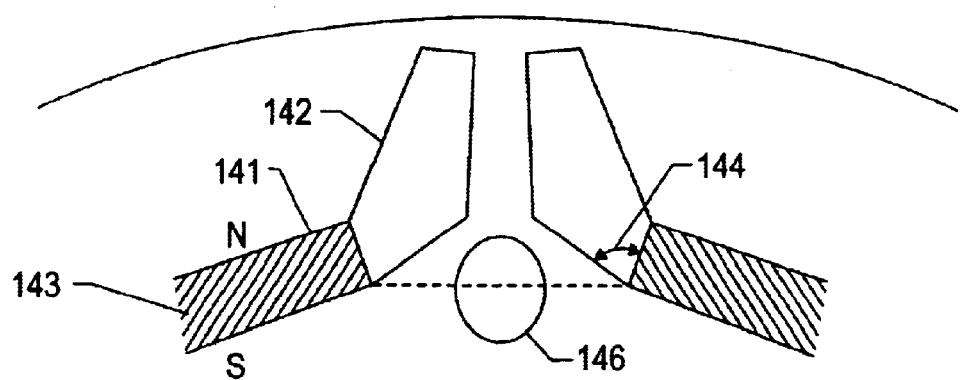
FIG. 14 generally illustrates an alternate design for a magnet retention slot with upturned portions.

It will be appreciated that the magnet retention slot configuration and low permeability region 126 described above are exemplary of the many configurations that will ensure: (i) that there are no direct linear paths between the end edges of the two adjacent magnets that do not pass through an area of low permeability, and (ii) that there are no direct linear paths that extend radially from the outer portion of the rotor to the interior of the rotor, between the permanent magnets that do not also pass through an area of low permeability. For example, FIG. 13 illustrates a rotor assembly 130 that uses a magnet retention slot 131 having upturned ends and an inter-slot area 132 of a circular shape to ensure that the described criteria is met. The rotor 130 is consistent with the teachings of the present disclosure. FIG. 14 generally illustrates a portion of a rotor having a similar design. In the design of FIG. 14, a magnet retention slot 141 is provided with upturned portions 142. A permanent magnet 143 is positioned within the slot. The upturned portion of the slot is configured such that the angle defined by the upturned portion of the slot and the edge of the permanent magnet (144) less than or equal to ninety-degrees (90°). Having angle 144 be less than or equal to ninety degrees (90°) helps inhibit movement of the magnet 143 from side to side. An area of low permeability in the form of an oval air gap 146 is defined by the rotor assembly. As FIG. 14 reflects, the area 146 and the upturned portions of the slot operate together to ensure that all paths between the edges of the adjacent permanent magnets or radially between the adjacent permanent magnets will pass through at least one area of low permeability.

Figure 15A:
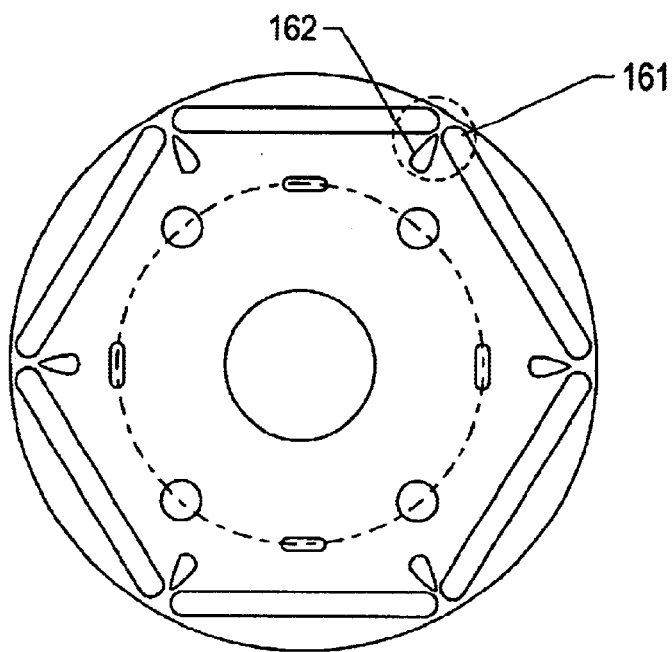
FIGS. 15A and 15B generally illustrate yet a further alternate design for a magnet retention slot and an intervening area of low permeability.
Figure 15B:
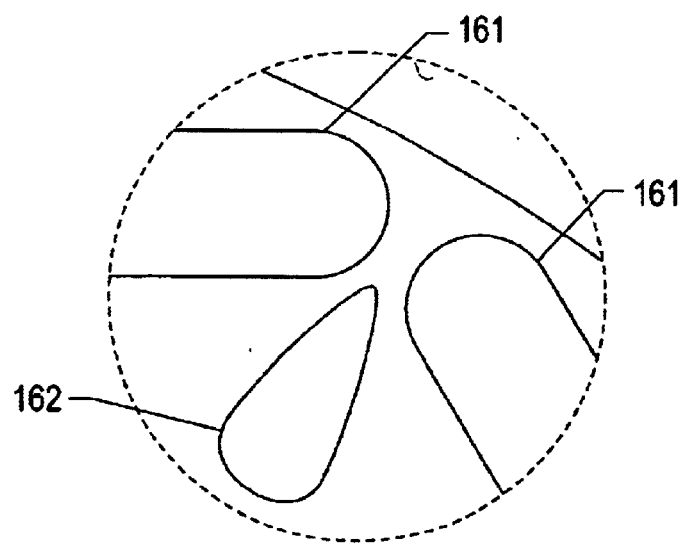

FIGS. 15A and 15B illustrate yet a further embodiment wherein adjacent magnet retention slots having a generally straight configuration with rounded ends 161 are separated by intervening areas of low permeability in the form of teardrop-shaped air gaps 162.

Figure 16:
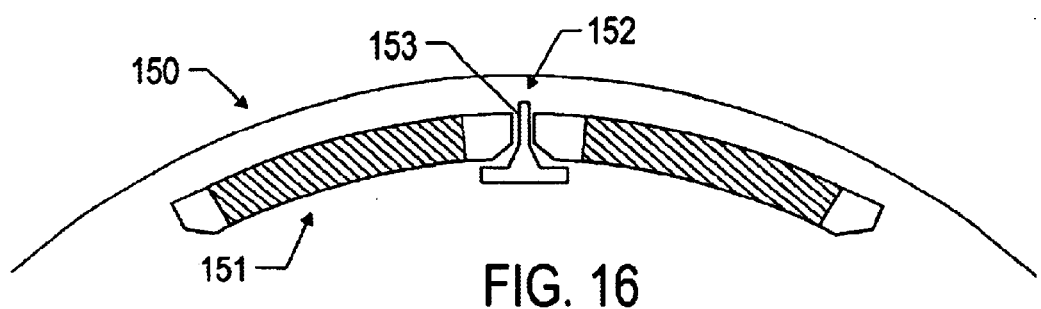
FIG. 16 illustrates an embodiment of an IPM motor wherein an area of low permeability is configured such that a single area of low permeability, by itself, guarantees that that all paths between the edges of the adjacent permanent magnets, or radially between the adjacent permanent magnets, will pass through at least one area of low permeability.

Still further embodiments are envisioned wherein a single area of low permeability is configured such that the single area of low permeability, by itself, guarantees that that all paths between the edges of the adjacent permanent magnets or radially between the adjacent permanent magnets will pass through at least one area of low permeability. Such an alternate embodiment is generally illustrated in FIG. 16 in which a rotor assembly 150 is illustrated that includes magnet retention slots 151 and an area of low permeability 152 positioned between adjacent magnet retention slots. As may be noted, the area of low permeability has a generally inverted T-shape and is configured such that any straight-line path between the edges of adjacent permanent magnets will pass through the generally radial portion 153 of area 152 and any straight line radial path between adjacent permanent magnets will pass through the portion of area 152 that is generally parallel to the magnet retention slots.

Through the use of some or all of the techniques described above, a high-torque output, low cogging torque IPM motor of relatively compact size may be developed. For example using some or all of the above techniques, an IPM motor having dimensions of approximately 6.3" outer diameter and 0.75" axially, a width across its widest radial portion may develop a torque output of approximately 4 Nt*M where the cogging torque is acceptably low (0.02 Nt*M (peak-peak)). Such characteristics allow for the use of such an IPM in accordance with certain teachings herein to be beneficially used in an appliance and, more particular, in a direct-drive washing machine.

Figure 17:
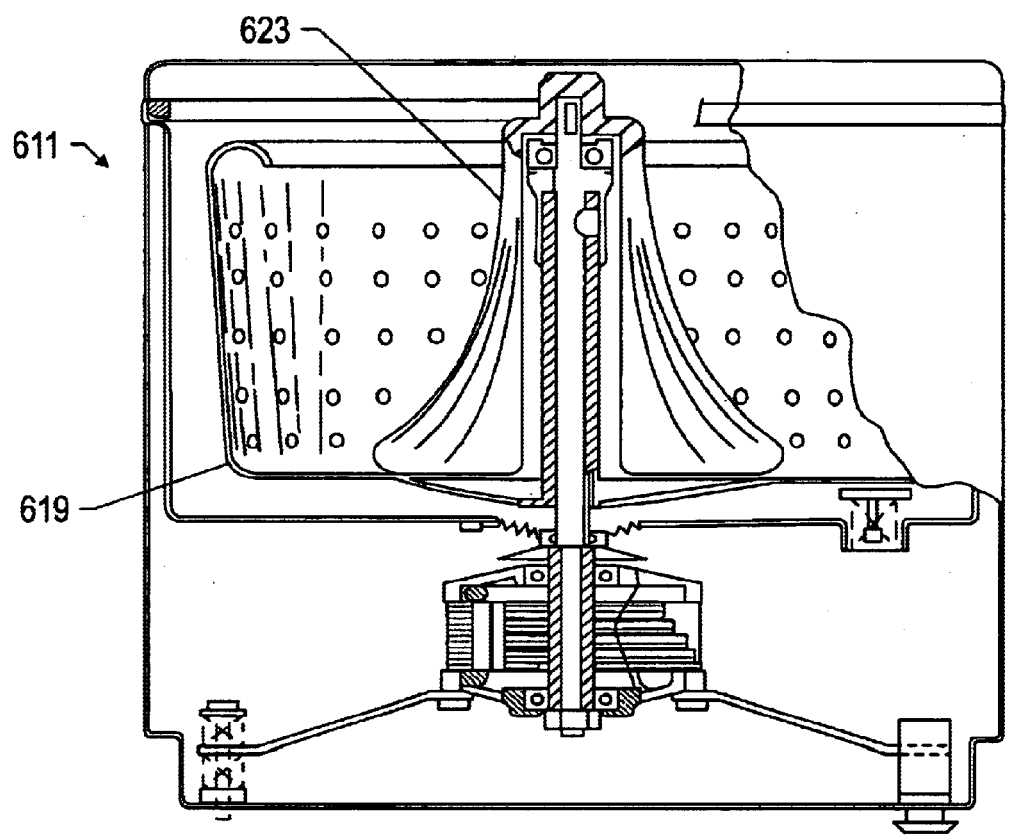
FIG. 17 generally illustrates a direct drive washing machine utilizing a high-torque output, low cogging torque IPM motor constructed in accordance with certain teachings of this disclosure.

FIG. 17 generally illustrates a direct drive washing machine utilizing a high-torque output, low cogging torque IPM motor constructed in accordance with certain teachings of this disclosure. IPM motors may be, for example, a 12-stator pole, 10-rotor pole IPM machine as depicted in FIG. 1 that has the three-phase concentrated winding pattern of FIGS. 2A and 2B. The mechanical aspects of the drive system may be as generally described in U.S. Pat. No. 4,819,460, the disclosure of which is hereby incorporated by reference.

As disclosed in the '460 Patent, a direct-drive washing machine 611 includes an agitator or impeller 623 and a perforated tub 619, which rotate about their co-linear longitudinal axes. The IPM motor directly drives the agitator or impeller during the wash cycle and both the agitator or impeller and the tub during the spin cycle, such that it is not necessary to provide a geared transmission. A motor drive (not pictured) powers the IPM motor. In one embodiment, the motor drive provides sinusoidal current excitation to the IPM motor. Because there is no geared transmission, the agitator or impeller and tub revolve at exactly the same rate as the motor shaft. Heavy-duty bearings may be provided in the motor because the sole axial support of the tub and the agitator or impeller is the motor. Various details of such construction are known in the art and/or are disclosed in the '460 Patent.

While the apparatus and methods of this invention have been described in terms of preferred embodiments, it will be apparent to those of skill in the art that variations may be applied to the process described herein without departing from the concept and scope of the invention. For example, while FIG. 17 illustrates the use of a motor constructed using some of the techniques disclosed herein in a washing machine where the tub is mounted vertically, alternate embodiments are envisioned wherein such a motor is used in a washing machine where the tub is horizontally mounted. All such similar substitutes and modifications apparent to those skilled in the art are deemed to be within the scope and concept of the invention.

What is claimed is:

1. A rotor for an interior permanent magnet machine comprising:
    a rotor stack defining at least one magnet retention slot, the slot having first and generally opposing surfaces; and
    a permanent magnet positioned within the magnet retention slot,
    wherein the magnet retention slot is formed with at least one wedged area on at least one end of the slot, the wedged area defined by a decrease in separation between the first and second opposing surfaces such that movement of the permanent magnet towards the at least one end of the slot will tend to cause the magnet to become wedged within the wedged area of the slot.

2. The rotor of claim 1 wherein the magnet retention slot is formed with wedged areas on both ends of the slot such that movement of the permanent magnet towards either end of the slot will tend to cause the magnet to become wedged within the wedded areas of the slot.

3. The rotor of claim 1 wherein retention the first and second surfaces are generally parallel and wherein the length of the first surface is greater than the length of the second surface.

4. A rotor for an interior permanent magnet machine comprising:
    a rotor stack defining at least one magnet retention slot; and
    a permanent magnet positioned within the magnet retention slot,
    wherein the magnet retention slot is formed such that movement of the permanent magnet towards at least one end of the slot will tend to cause the magnet to become wedged within the slot,
    wherein the magnet retention slot includes first and second generally parallel surfaces where the length of the first surface is greater than the length of the second surface, and
    wherein the permanent magnet has a generally rectangular cross-section and a surface of the permanent magnet that is generally parallel to the second surface has a length that is less than the length of the second surface.

5. The rotor of claim 1 wherein the wedged area is formed by a relatively sharp surface on at least one end of one of the first or the second surface and wherein movement of the permanent magnet towards the at least one end tends to cause the relatively sharp surface to bite into the permanent magnet.

6. The rotor of claim 1 wherein the wedged areas is formed by a generally sloped region on at least one end of the first or the second surfaces and wherein movement of the permanent magnet towards the sloped region tends to cause the permanent magnet to become wedged between the sloped region and the surface that does not define the sloped region.

7. The rotor of claim 1 wherein the first surface is positioned at a point radially outward of the second surface.

8. The rotor of claim 1 wherein the wedged area of the slot is formed to inhibit movement of the permanent magnets along a direction generally perpendicular to the axis of rotation of the rotor.

9. The rotor of claim 1 further including adhesive tending to bond the permanent magnet to one of the first or the second surfaces.

10. A rotor for an interior permanent magnet machine that tends to reduce magnet chattering, the rotor comprising:
   a rotor stack the rotor stack defining at least one magnet retention slot; and
   a permanent magnet positioned within the magnet retention slot, the permanent magnet having a generally rectangular cross-section and a length extending generally along the length of the magnet retention slot in a direction generally perpendicular to the axis of rotation of the rotor;
   wherein the magnet retention slot defines generally parallel first and second surfaces, and
   wherein:
      (i) the length of the first surface along the direction generally perpendicular to the axis of rotation of the rotor is longer than the length of the permanent magnet;
      (ii) the length of the second surface along the direction generally perpendicular to the axis of rotation of the rotor is longer than the length of the first surface; and
      (iii) at least one end of the second surface defines a sloped region such that movement of the permanent magnet towards the at least one end will tend to cause the permanent magnet to become wedged between the sloped region and the first surface.

11. The rotor of claim 10 wherein both ends of the second surface define a sloped region.

12. The rotor of claim 10 wherein at least one end of one of the first surfaces defines a relatively sharp surface and wherein movement of the permanent magnet towards at least one end tends to cause the relatively sharp surface to bite into the permanent magnet.

13. The rotor of claim 10 wherein the first surface is positioned at a point radially outward of the second surface.

14. The rotor of claim 10 further including means for inhibiting, movement of the permanent magnets in a direction generally parallel to the axis of rotation of the rotor.

15. The rotor of claim 10 further including adhesive tending to bond the permanent magnet to one of the first or the second surfaces.

16. A rotor for an interior permanent magnet machine that tends to reduce magnet chattering, the rotor comprising:
   a rotor stack, the rotor stack defining at least one magnet retention slot and defining an axis of rotation; and
   a permanent magnet positioned within the magnet retention slot,
   wherein the magnet retention slot is formed such that movement of the permanent magnet in a direction generally parallel to the axis of rotation of the rotor towards at least one end of the slot will tend to cause the magnet to become wedged within the slot; and,
   wherein the rotor stack includes a plurality of rotor laminations, said rotor laminations having geometries that vary along the axis of rotation of the rotor to define at least one wedged area at an end of the slot; and,
   wherein said movement of the permanent magnet towards the wedge area tends to cause the permanent magnet to become wedged within the slot between the wedged area and a surface of the magnet retention slot.

17. The rotor of claim 16 further including a wedge insert positioned within the magnet retention slot, wherein the wedge insert is oriented such that movement of the permanent magnet in the direction generally parallel to the axis of rotation towards the wedge insert will tend to cause the permanent magnet to become wedged between the wedge insert and a surface of the magnet retention slot.

18. A rotor for an interior permanent magnet machine that tends to reduce magnet chattering, the rotor comprising:
   a permanent magnet positioned within a slot of the rotor;
   means for wedging the permanent magnet when the permanent magnet tends to move during rotation of the rotor; and,
   means for biting being located at one end of the slot to lock at least one end of the permanent magnet within the slot when the permanent magnet tends to move during rotation of the rotor.

19. The rotor of claim 18 wherein the means for wedging the permanent magnet includes means for inhibiting movement of the permanent magnet in a direction generally parallel to the axis of rotation of the rotor.

20. The rotor of claim 18 wherein the means for wedging the permanent magnet includes means for inhibiting movement of the permanent magnet in a direction generally perpendicular to the axis of rotation of the rotor.

21. The rotor of claim 3 wherein the permanent magnet has a generally rectangular cross-section and a surface of the permanent magnet that is generally parallel to the second surface has a length that is less than the length of the second surface.

22. The rotor of claim 4 wherein the magnet retention slot is formed such that movement of the permanent magnet towards either end of the slot will tend to cause the magnet to become wedged within the slot.

23. The rotor of claim 4 wherein at least one end of one of the first or the second surface defines a relatively sharp surface and wherein movement of the permanent magnet towards the at least one end tends to cause the relatively sharp surface to bite into the permanent magnet.

24. The rotor of claim 4 wherein at least one end of the first or the second surfaces defines a generally sloped region such that movement of the permanent magnet towards the sloped region tends to cause the permanent magnet to become wedged between the sloped region and the surface that does not define the sloped region.

25. The rotor of claim 4 wherein the first surface is positioned at a point radially outward of the second surface.

26. The rotor of claim 4 wherein the slots are formed to inhibit movement of the permanent magnets along a direction generally perpendicular to the axis of rotation of the rotor.

27. The rotor of claim 4 further including adhesive tending to bond the permanent magnet to one of the first or the second surfaces.

* * * * *

UNITED STATES PATENT AND TRADEMARK OFFICE
CERTIFICATE OF CORRECTION

PATENT NO. : 6,891,298 B2
DATED : May 10, 2005
INVENTOR(S) : Gary E. Horst

It is certified that error appears in the above-identified patent and that said Letters Patent is hereby corrected as shown below:

Title page,
Item [12], should read -- Horst --.
Item [75], Inventor, change "Horst E. Gary" to -- Gary E. Horst --.

Column 14,
Line 31, change "wedded" to -- wedged --.
Line 61, change "areas" to -- area --.

Signed and Sealed this

Twenty-seventh Day of September, 2005

JON W. DUDAS
*Director of the United States Patent and Trademark Office*